Feb. 3, 1931.   J. O. GOODWIN   1,791,307
FABRIC SLITTING MACHINE
Filed April 18, 1929

Inventor,
John O. Goodwin,
By Robert M. Pierson Atty.

Patented Feb. 3, 1931

1,791,307

UNITED STATES PATENT OFFICE

JOHN O. GOODWIN, OF AKRON, OHIO, ASSIGNOR TO SEIBERLING RUBBER COMPANY, OF BARBERTON, OHIO, A CORPORATION OF DELAWARE

FABRIC-SLITTING MACHINE

Application filed April 18, 1929. Serial No. 356,004.

This invention relates to means for slitting fabric and other sheet material and particularly rubber-frictioned, bias-cut, woven fabric.

One of the main objects of my invention is to provide means for clearing the severed fabric edges from the cutting knife as soon as the cut has been made. If said edges remain in contact with the cutting disk while the material is traveling past the latter, the rapid rotation of said disk against the material will heat the disk and tend to soften the rubber coating on the material, thus still further increasing the friction, tending to gum the knives and produce a generally undesirable condition which is avoided in the present invention.

A further object is to produce a frayed or ragged condition of the individual threads at the severed edge of the fabric, whereby the fibers are more or less pulled out in the form of a tuft at each thread end, thus adapting the cut strip to be effectively united with gum material such as rubber embedding the cut edge. In the manufacture of pneumatic tires, for example, where flipper strips and chafer strips of rubberized fabric are incorporated in the beads and at times associated with gum strips or fillers, it is desirable to have the rubber thoroughly united with the fabric strip around the edges as well as along the surface of the latter so that the fabric may taper off into the rubber. The ragged edge produced by my invention contributes to this result.

Of the accompanying drawings, Fig. 1 is a perspective view showing the fabric guides and rotary cutters in a preferred embodiment of my invention.

Figure 1:
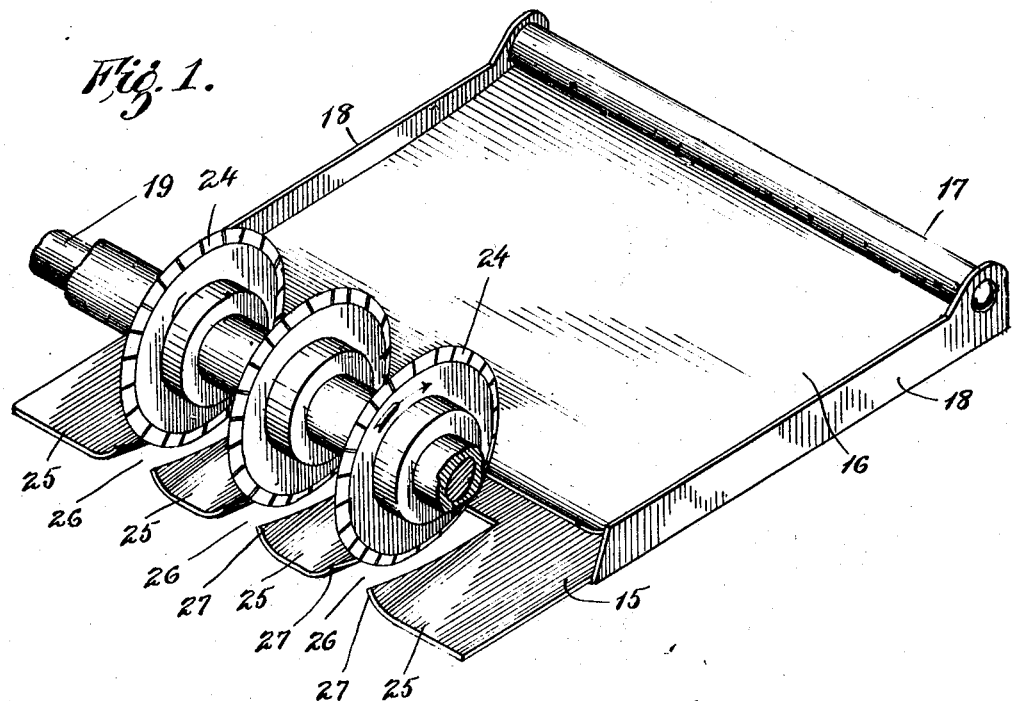

In the drawings, 10 (Fig. 3) indicates a strip of rubberized, bias, woven fabric of the necessary width to form the desired number, four in this instance, of narrower strips 11 adapted for uses such as in pneumatic tire manufacture to form the flippers and chafers in the beads of the tire casing.

The cutting apparatus includes a suitable fabric supporting and guiding device such as a fixedly-mounted lower plate 15 and an upper plate 16 pivoted at 17 at its rear end between edge guides 18 at the side edges of the lower plate, the fabric strip passing between these plates and being lightly held down on the lower one by the weight of the upper plate so that it will be smoothly and accurately presented to the action of the cutter disks.

Mounted above the path of the fabric is a cutter shaft 19 supported in suitable end bearings and adapted to be rapidly rotated by any suitable means such as an electric motor belted to the shaft. A series of toothed rotary slitting knives or cutter disks 24, three in number for making four strips 11, are fixed to the shaft 19 at the desired intervals, these disks having sharpened edges which might in some instances be continuous instead of interrupted by notches as shown, their action on the fabric partaking of the nature of a sawing operation.

Figure 3:
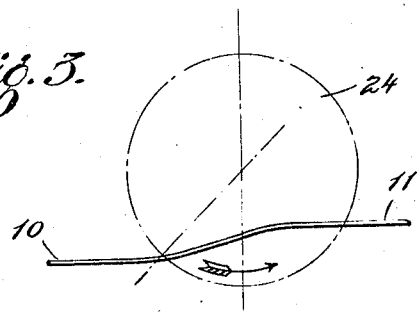
Fig. 3 is a diagrammatic side view showing the course of the fabric with reference to a cutter disk.

The fabric strips 11 are fed forward by means of a suitable power-driven roller (not shown) located beyond the cutting position, and the shaft 19 and cutters 24 are preferably rotated in the direction of the arrows shown in Figs. 1 and 3, so that the lower edges of the cutters move in a direction coinciding with the travel of the fabric. The latter will therefore be cut without substantial stretching tension, and narrowing of the cut strips is avoided.

Figure 2:
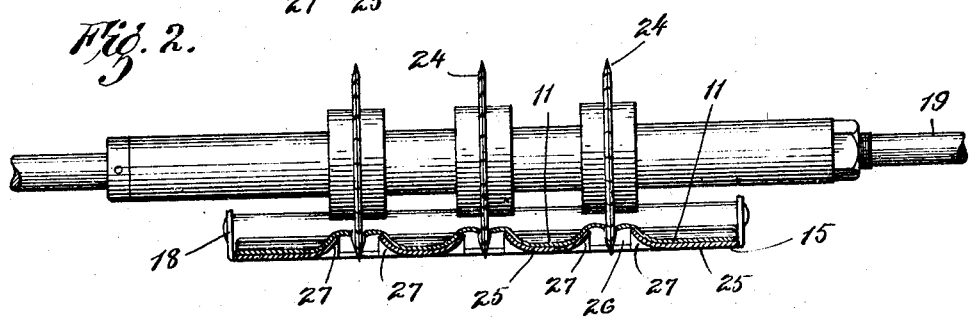
Fig. 2 is a front elevation, with the guides and work in transverse, vertical section.

The forward margin of the lower guide-plate 15 is divided into a number of individual fabric guides 25 separated by slots 26 for the reception of the cutter disks 24, and the edges of said guides flanking the cutter disks are progressively bent up to a semi-upright position as indicated at 27, from nothing at their rear ends to a maximum at their front ends, the effect of this being to elevate the fabric slightly at the cutting point and more so as it progresses past the cutters as indicated in Fig. 3 and thus to cause a troughing of the cut strips 11 accompanied by a spreading and falling away of their edges from the sides of the cutter disks. The fabric is also slightly troughed over the slots 26, at and just before it reaches the cutting point, by the action of the cutter disks as indicated in Fig. 2.

Figure 4:
Fig. 4 is a perspective view showing one of the intermediate strips formed by the slitting operation and illustrating the ragged condition of its edges.

In the operation of this apparatus, the spreading and falling away of the cut edges of the individual strips 11 from the sides of the cutter disks 24, produced by the upturned guide edges 27, reduces frictional heating of said cutter disks which, if allowed to occur, would cause objectionable softening of the rubber coating on the fabric, accompanied by smearing of said rubber on the cutter disks. It also contributes, in a way which I am unable fully to explain, but which evidently involves more or less of a tearing action, to the formation of frayed or tufted edges 34 on the cut strips 11 as indicated in Fig. 4, it being found that when the fabric is guided past the cutting point in flat condition or with its edges slightly depressed below the intermediate portions of the strips, such effect is not noticeably produced, but the edges are sharper cut. This ragged condition of the thread fibers is useful in tire or anologous construction where the tapering off of a fabric edge into an adjacent rubber bond is desired.

It will be understood that various changes may be made in the described embodiment and carrying out of my invention without departing from its scope as defined in the claims.

I claim:

1. In a fabric slitting machine, the combination of a rotary sawing cutter and guide devices flanking said cutter for supporting the traveling fabric in a generally horizontal path while being slit, said devices including means for deflecting the severed edges upwardly and away from the cutter.

2. In a fabric slitting machine, the combination of a disk cutter adapted to be rapidly rotated in a direction coinciding with the feed of the material, and a fabric supporting and guiding structure including members located on opposite sides of the cutter and having fabric-contacting edges progressively rising from the plane of said members in the direction of fabric feed beyond the cutting point, for causing the cut fabric to fall away from the sides of the cutter.

In witness whereof I have hereunto set my hand this 15th day of April, 1929.

JOHN O. GOODWIN.